(12) United States Patent
Greif et al.

(10) Patent No.: US 10,646,929 B2
(45) Date of Patent: May 12, 2020

(54) CLAMPING DEVICE AND MACHINING UNIT COMPRISING SUCH A CLAMPING DEVICE

(71) Applicant: Ott-Jakob Spanntechnik GmbH, Lengenwang (DE)

(72) Inventors: Josef Greif, Friesenried (DE); Peter Mohr, Wiggensbach (DE); Conrad Rösch, Pfronten (DE); Bartholomäus Reisacher, Buchloe (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 28 days.

(21) Appl. No.: 15/938,715

(22) Filed: Mar. 28, 2018

(65) Prior Publication Data

US 2018/0290215 A1 Oct. 11, 2018

(30) Foreign Application Priority Data

Apr. 7, 2017 (DE) .................. 10 2017 107 488

(51) Int. Cl.
*B23B 31/26* (2006.01)
*B23B 29/04* (2006.01)
(Continued)

(52) U.S. Cl.
CPC .......... *B23B 31/261* (2013.01); *B23B 29/046* (2013.01); *B23B 31/1173* (2013.01);
(Continued)

(58) Field of Classification Search
CPC ............... B23B 31/261; B23B 31/1173; B23B 2231/50; B23B 2260/03; B23B 2260/034; B23B 2260/136
See application file for complete search history.

(56) References Cited

U.S. PATENT DOCUMENTS

| 4,604,009 A | 8/1986 | Tennerstedt |
| 2017/0157679 A1* | 6/2017 | Greif ..................... B23B 31/261 |

FOREIGN PATENT DOCUMENTS

| DE | 102004026438 B4 | 4/2009 |
| DE | 202014104118 U1 | 1/2016 |

OTHER PUBLICATIONS

Result of examination report for German Patent Application No. 10 2017 107 488.0 filed Apr. 7, 2017.

* cited by examiner

*Primary Examiner* — Alan Snyder
(74) *Attorney, Agent, or Firm* — Paul D. Bianco; Stephen Bongini; Fleit Intellectual Property Law

(57) ABSTRACT

A clamping device for clamping a workpiece or a tool or, more specifically, a tool holding fixture in a machine part of a machine tool includes a tension rod slidably mounted within the machine part; a clamping set movable by the tension rod between clamped and released positions; a tension spring dedicated to the tension rod so as to generate the pull-in force of the clamping set; and a release mechanism, by which the clamping set can be moved against the force of the tension spring into the released position by the tension rod. To make possible effective clamping at optimum force, the tension spring is clamped between first and second rod parts of the tension rod. The second rod part can move relative to the first rod part, and, as the clamping set moves into the released position, is compressed on both ends by the release mechanism by moving the two rod parts in opposite directions.

17 Claims, 5 Drawing Sheets

(51) Int. Cl.
 *B23B 31/117* (2006.01)
 *B23B 31/30* (2006.01)
(52) U.S. Cl.
 CPC .......... *B23B 31/30* (2013.01); *B23B 2231/50* (2013.01); *B23B 2260/03* (2013.01); *B23B 2260/034* (2013.01); *B23B 2260/136* (2013.01)

CLAMPING DEVICE AND MACHINING UNIT COMPRISING SUCH A CLAMPING DEVICE

FIELD OF THE DISCLOSURE

The disclosure relates to a clamping device for clamping a workpiece or a tool or, more specifically, a tool-holding fixture in a machine part of a machine tool. The disclosure also relates to a machining unit comprising such a clamping device.

BACKGROUND

A clamping device of this type is known from DE 10 2004 026 438 B4. This clamping device comprises a tension rod slidably mounted within a machine spindle and a clamping set mounted within the machine spindle, which clamping set can be moved between a clamped position and a released position by means of the tension rod. In addition, a tension spring in the form of a plate spring assembly is mounted in the machine spindle for generating the clamping force of the clamping set. The tension spring is clamped between the tension rod at a rearward end, which has an enlarged diameter, and a retaining ring axially braced within the machine spindle. By means of a release mechanism disposed at the rearward end of the machine spindle, the clamping set can be moved into the released position against the force of the tension spring by means of the tension rod. Since the tension spring in this prior-art clamping device is braced on one side against the machine spindle, the machine spindle is actuated with a relatively high axial force. As a result, e.g., the bearing of the machine spindle, which is generally rotatably mounted in a spindle jacket or a spindle holding fixture, is subjected to significant wear.

Thus, there exists a need for an improved clamping device and a machine unit comprising such a clamping device.

SUMMARY OF THE DISCLOSURE

One aspect of the disclosure relates to a clamping device and a machining unit comprising such a clamping device, which together allow effective clamping at optimum force.

Further advanced modifications and useful embodiments are also disclosed.

In the clamping device according to the disclosure for clamping a workpiece or a tool or, more specifically, a tool-holding fixture in a machine part of a machine tool, the tension spring for generating the pull-in force of a clamping set disposed in the machine part is clamped between a first rod part and a second rod part of the tension rod, where second rod part is able to move relative to the first rod part and, as the clamping set moves into the released position, is compressed by the release mechanism on both ends by the opposite movement of the two rod parts relative to one another. This allows the axial forces generated by the tension spring to be more effectively utilized and the wear on the machine part holding the clamping device to be reduced.

To effect an opposite movement of the two rod parts at as little expense and effort as possible, the release mechanism can comprise an enclosure for moving the second rod part which is slidably mounted within a stationary receiving fixture, and a pressure piston for moving the first rod part which is slidably mounted within a pressure chamber of the enclosure and moved by means of a pressure medium. The movable configuration of the enclosure allows the enclosure to be pushed rearward relative to the machine part, which is unable to move in the axial direction, when the pressure piston pushes the first rod part into the machine part. This makes it possible for the second rod part to be simultaneously pulled out of the machine part through the movable enclosure.

Disposed on the rearward end of the second rod part is a tension sleeve which is connected by means of a connecting piece to the enclosure of the release mechanism. For easy installation, the connecting piece can comprise a plurality of caliper-type connecting elements spaced apart from each other in the circumferential direction, the front and rear lugs of which extend over a collar on the tension sleeve and a collar on an enclosure section of the enclosure. The caliper-type connecting elements can be held together by a spring and can be inwardly biased.

A rearward end of the first rod part, which has an enlarged diameter, is preferably guided in the tension sleeve so as to be axially slidable. The rearward end of the first rod part can be connected to a thrust ring by means of a plurality of pins which are guided in the tension sleeve so as to be axially slidable.

The tension spring is preferably clamped between an annular shoulder of the second rod part and the thrust ring which is connected to the first rod part. By moving the two rod parts of the tension rod in opposite directions, the tension spring can thus be easily compressed from both sides as the clamping device is released.

In a preferred embodiment of the disclosure, the clamping set has a two-part clamping cone, the two parts of which can be moved in opposite directions by means of the two rod parts of the tension rod, and a plurality of tensioning elements abutting the outside of said parts and being spaced apart from each other in the circumferential direction, which tensioning elements can be moved between a radially outward clamping position and a radially inward release position by sliding the two parts of the clamping cone in opposite directions. In contrast to a single-part clamping cone, the actuating force is not braced on the enclosure, but is transmitted to the other part of the clamping cone. This leads to an improved tension spring load factor and a more effective clamping procedure.

In a second preferred embodiment, the tensioning elements have a first inside clamping surface for abutting a conical exterior surface of the first part of the clamping cone and a second inside clamping surface for abutting a conical exterior surface of the second part of the clamping cone.

To ensure that the two parts of the clamping cone, which are able to slide relative to one another, are effectively and accurately guided, the first part of the clamping cone has a cylindrical guide area on which a hollow cylindrical guide section of the second part of the clamping cone is slidably guided.

The tensioning elements can be configured, e.g., in the form of clamping claws, with a first outside clamping surface, which is formed by a conical surface section, and a second outside clamping surface which slants in the opposite direction relative to the first clamping surface and which is also formed by a conical surface section. However, the tensioning elements can also have a different configuration.

The disclosure also relates to a machining unit of a machine tool comprising a machine part and an above-described clamping device for clamping a workpiece or a tool or, more specifically, a tool-holding fixture to the machine part.

In a particularly useful embodiment, the tension spring is disposed in a through-opening of the machine part, which tension spring is spaced apart from the machine part both in the clamped position and in the released position of the clamping set. Thus, both in the clamped position and in the released position of the clamping set, the force generated by the tension spring is absorbed by the two tension rods so that the stress on the machine part holding the clamping device can be further reduced and the load factor of the tension spring can be markedly improved.

In a preferred embodiment, the machine part can be a work spindle which is rotatably mounted in a spindle holding fixture and rotated by a motor.

BRIEF DESCRIPTION OF THE DRAWINGS

Additional characteristic features and advantages of the disclosure follow from the description of a preferred embodiment example below, with reference to the drawing. The figures show.

DETAILED DESCRIPTION

Figure 1:
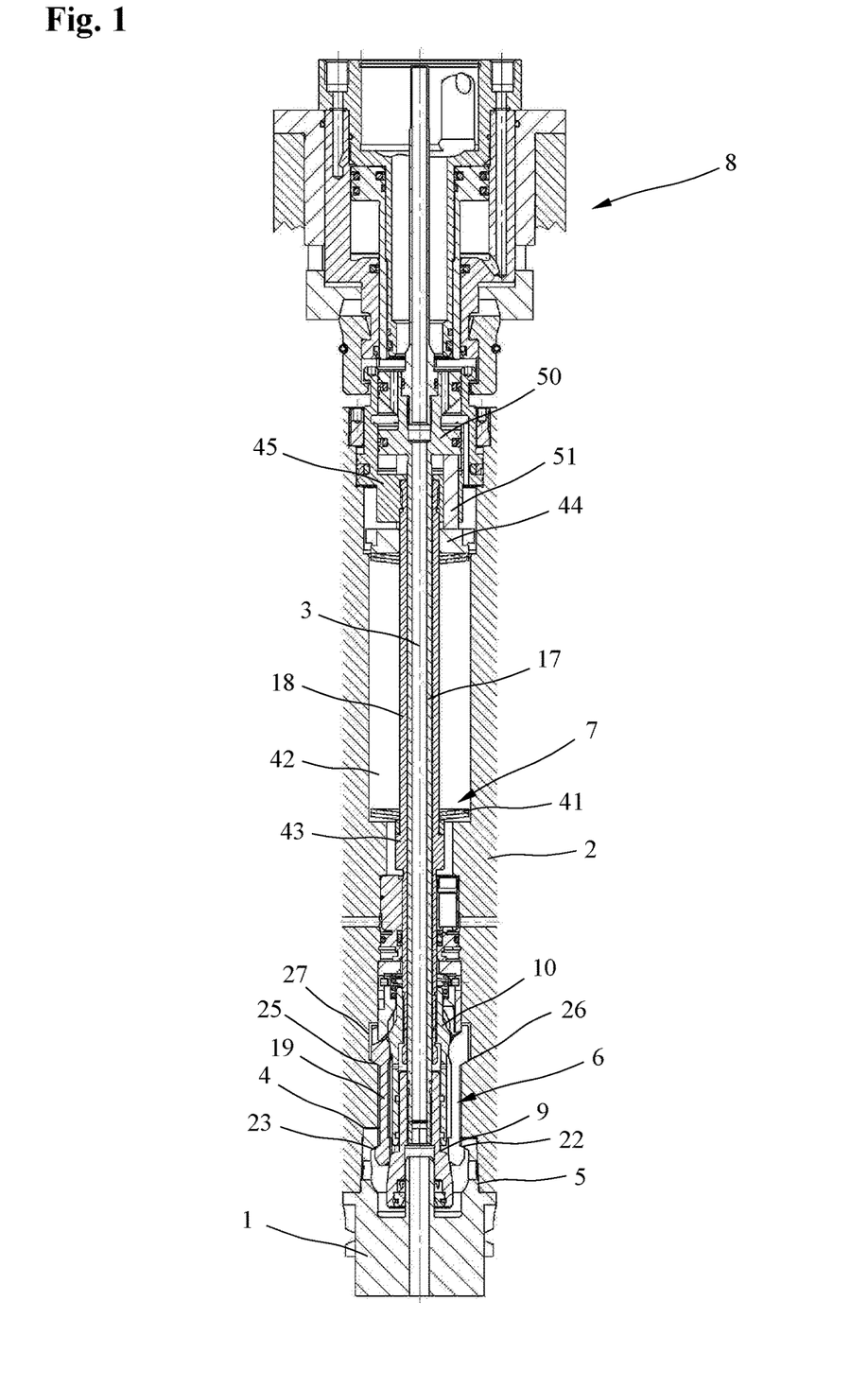
FIG. 1 a longitudinal section through a clamping device in a clamped position.
Figure 2:
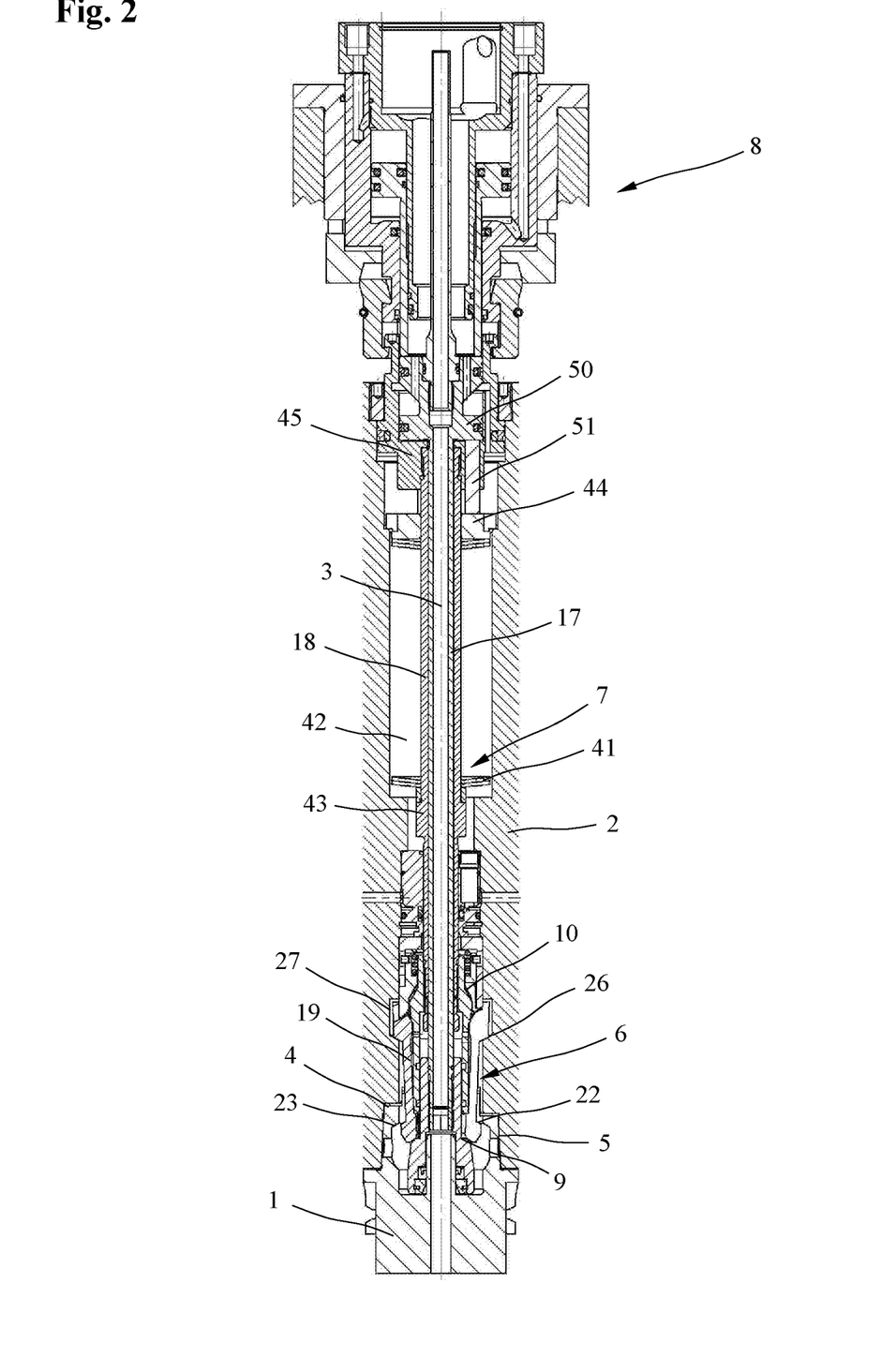
FIG. 2 a longitudinal section through a clamping device in a released position.

FIGS. 1 and 2 show a clamping device for clamping a tool-holding fixture 1 to a machine part 2 of a machine tool in a clamped position (FIG. 1) and in a released position (FIG. 2). In the embodiment example shown, the machine part 2 is a work spindle which, by means of bearings (not shown in the drawing), is mounted about the longitudinal axis 3 in a spindle holding fixture and which can be rotated about the longitudinal axis 3 by means of a drive unit (not shown in the drawing). On its front end, which in FIGS. 1 and 2 is disposed on the bottom, the machine part 2, here in the form of a work spindle, has a conical receiving slot 4 for receiving a clamping cone 5 on the tool-holding fixture 1. In the embodiment example shown, the tool-holding fixture 1 is an HSK tool-holding fixture with a clamping cone 5 in the form of a hollow taper shank.

Disposed in the machine part 2, here in the form of a work spindle, is a clamping set 6 which is able to move between a clamped position and a released position and which is actuated by a tension spring 7, here in the form of a plate spring assembly and also disposed in the machine part 2, to move into the clamped position for holding the tool-holding fixture 1 and moved by a release mechanism 8 disposed on the rearward end of the machine part 2 against the force of the tension spring 7 into the released position for releasing the tool-holding fixture 1.

Figure 3:
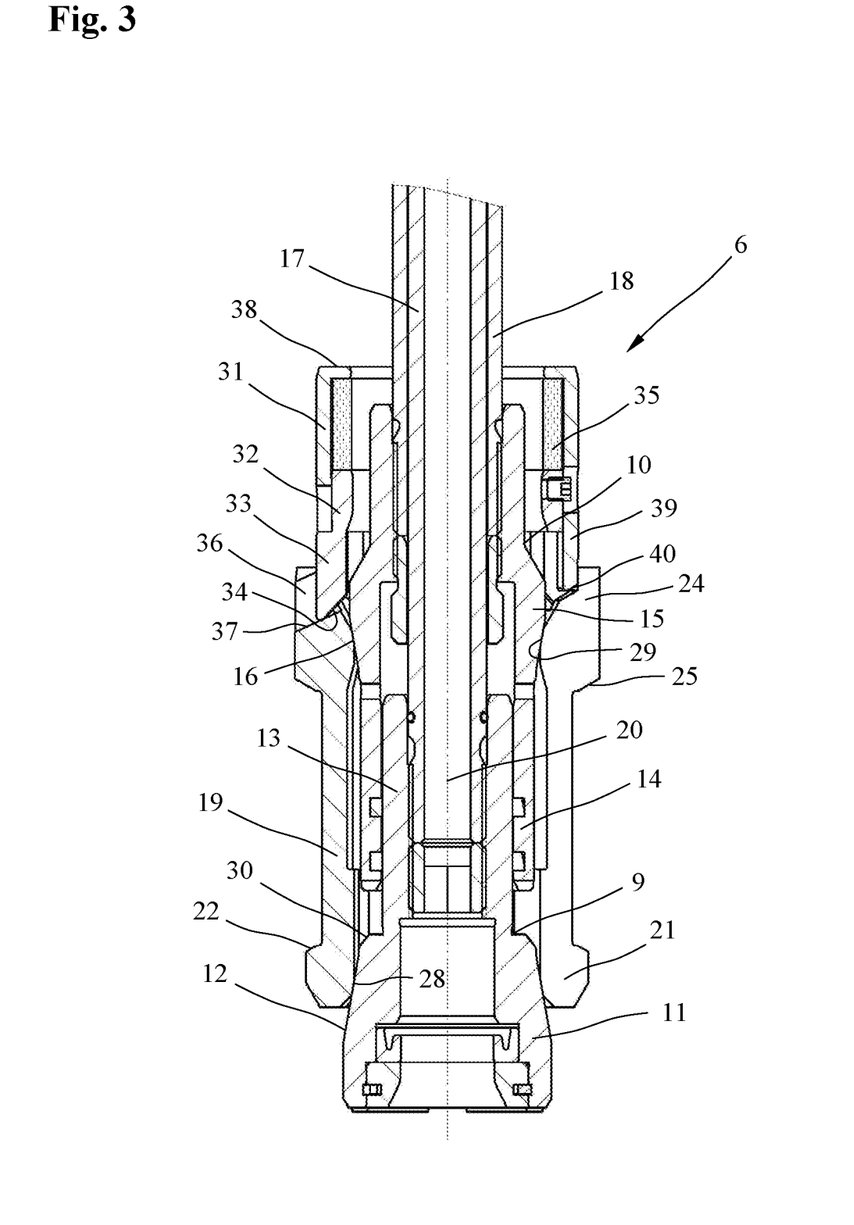
FIG. 3 a detail view of a clamping set of the clamping device shown in FIGS. 1 and 2.

The clamping set 6, which is separately presented in FIG. 3, comprises a clamping cone consisting of two separate parts 9 and 10 which move axially in opposite directions. The first part 9 of the clamping cone, which first part faces the tool-holding fixture 4 and which in FIG. 3 is disposed at the bottom, comprises a conical clamping area 11 with a conical exterior surface 12 and a cylindrical guide area 13. The second part 10 of the clamping cone comprises a hollow cylindrical guide section 14, which is slidably guided on the guide area 13 of the first part 9, and a conical clamping area 15 with a conical exterior surface 16. The conical exterior surfaces 12 and 16 of the clamping areas 11 and 15 on the two parts 9 and 10 slant in opposite directions relative to each other. The guide area 13 and the guide section 14 allow the two parts 9 and 10 of the clamping cone are guided so as to be axially slidable in opposite directions.

The two parts 9 and 10 of the clamping cone can be moved by a two-part tension rod with an axially slidable first rod part 17 and a second rod part 18 that is axially slidable relative to the first rod part 17. The first part 9 of the clamping cone is attached to the front end of the first rod part 17, here in the form of a tube, and the second part 10 of the clamping cone is attached to the end of the second tubular rod part 18, which is disposed around and coaxial to the first rod part 17. By means of the two rod parts 17 and 18, it is possible for the two parts 9 and 10 of the clamping cone to be moved toward or away from one another.

Abutting the conical exterior surface 12 of the first part 9 and the conical exterior surface 16 of the second part 10 of the clamping cone are a plurality of tensioning elements 19, which are equally spaced apart from each other in the circumferential direction and which, in a clamped position as shown in FIG. 3, are disposed parallel to a centerline axis 20 of the clamping set 3. The tensioning elements 19, here in the form of clamping claws, have a thickened first end 21 facing the tool-holding fixture 1, with a first outside clamping surface 22 which, in a clamped position as shown in FIG. 1, comes to abut, in a manner known in the prior art, a conical inside surface 23 on the inside of the clamping cone 5 of the tool-holding fixture 1. The claw-shaped tensioning elements 19 also have a thickened second end 24 with a second outside clamping surface 25, which slants in the direction opposite to the first clamping surface 22, and also formed by a conical surface section, by means of which second outside clamping surface the tensioning elements 19 are braced, as shown in FIG. 1, on a conical counter surface 26 within an annular ledge 27 in the machine part 2.

Moving the two parts 9 and 10 of the clamping cone toward one another allows the claw-shaped tensioning elements 19 to be moved into the radially outward clamped position, and moving the two parts 9 and 10 of the clamping cone away from one another allows them to be moved into the radially inward released position.

In the clamped position shown in FIG. 3, the claw-shaped tensioning elements 19, with a first inside clamping surface 28 disposed on the inside of the front end 19, abut the conical exterior surface 12 of the first part 9 and, with a second inside clamping surface 29 disposed on the inside of the rearward end 24, the tensioning elements abut the conical exterior surface 16 of the second part 10.

In the released position shown in FIG. 2, the front ends 21 of the claw-shaped tensioning elements 19 engaging in the tool-holding fixture 1, with their first inside clamping surfaces 28, are disposed on chamfers 30, as shown in FIG. 3, at the transition from the conical clamping area 11 to the more slender guide area 13 on the first part 9 of the clamping cone so that the front ends 21 of the claw-shaped tensioning elements 19 are radially moved inwardly and release the tool-holding fixture 1 for exchange or replacement. The conical exterior surfaces 12 and 16 on the two parts 9 and 10 of the clamping cone and the inside clamping surfaces 28 and 29 of the claw-shaped tensioning elements 19 are configured to allow the tensioning elements 19 to move radially outwardly when the two parts 9 and 10 of the clamping cone are pushed together and to move radially inwardly when the two parts 9 and 10 are pushed apart.

Disposed on the second ends 24 of the claw-shaped tensioning elements 19 abutting the second part 10 of the clamping cone is a spacer, shown in greater detail in FIG. 2, by means of which the tensioning elements 19 in the circumferential direction are spaced a predefined distance apart from each other. The spacer contains a holding sleeve 32 which is axially slidably guided within a guide sleeve 31 and which, on its end facing the tensioning elements 19, has a plurality of ledges 33 with slanted front-end surfaces 34, which ledges are equally spaced in the circumferential direction and protrude in the axial direction. The holding sleeve 32 slides within the guide sleeve 31 and is pushed by a compression spring 35 in the direction of the claw-shaped tensioning elements 19. The ledges 33 of the holding sleeve 32 engage in a groove 36 on the rearward second end 24 of the claw-shaped tensioning elements 19 and, with their slanted front-end surface 34, abut a slanted counter surface 37 in the base of the groove 36.

The guide sleeve 31 has a rearward contact surface 38 and, on its front end, comprises a plurality of ring segments 39, which have slanted front ends 40 for abutting the rearward second ends 24 of the claw-shaped tensioning elements 19 and which are spaced apart from each other in the circumferential direction and protrude between the ledges 33 of the holding sleeve 32.

As FIGS. 1 and 2 indicate, the tension spring 7, here in the form of a plate spring assembly comprising a plurality of plate springs 41 arranged one behind the other, is disposed in a central part of a through-opening 42 of the machine part 2 and is clamped between an annular shoulder 43 of the radially outward second rod part 18 and a thrust ring 44 which is axially slidable within the through-opening 42. The tension spring 7 is disposed between the annular shoulder 43 and the thrust ring 44 in such a manner that it does not come into contact with the machine part 2 either in the clamped position shown in FIG. 1 or in the released position shown in FIG. 2.

Figure 4:
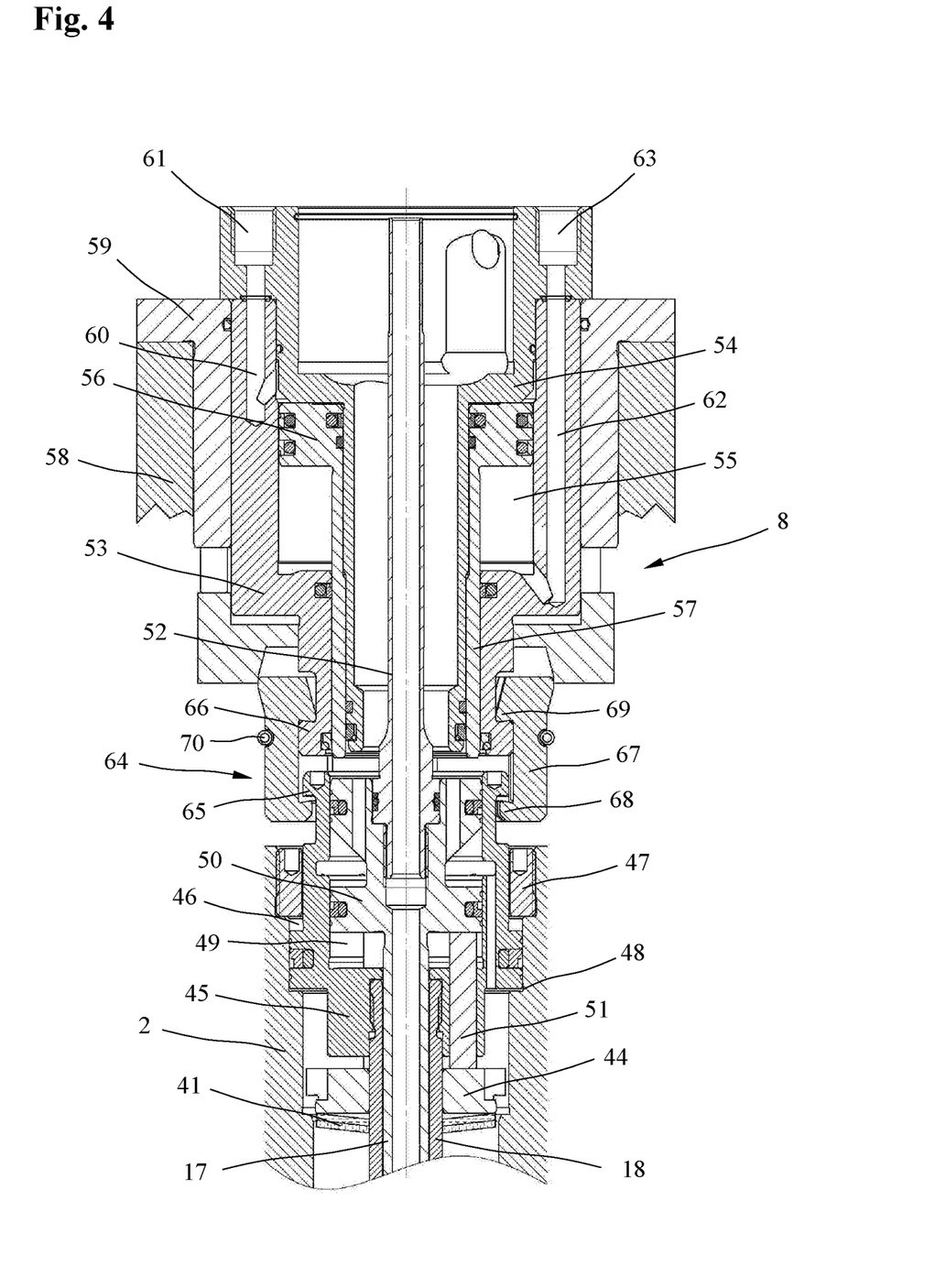
FIG. 4 a longitudinal section through an actuating mechanism in a clamped position and FIG. 5 a longitudinal section through an actuating mechanism in a released position.
Figure 5:
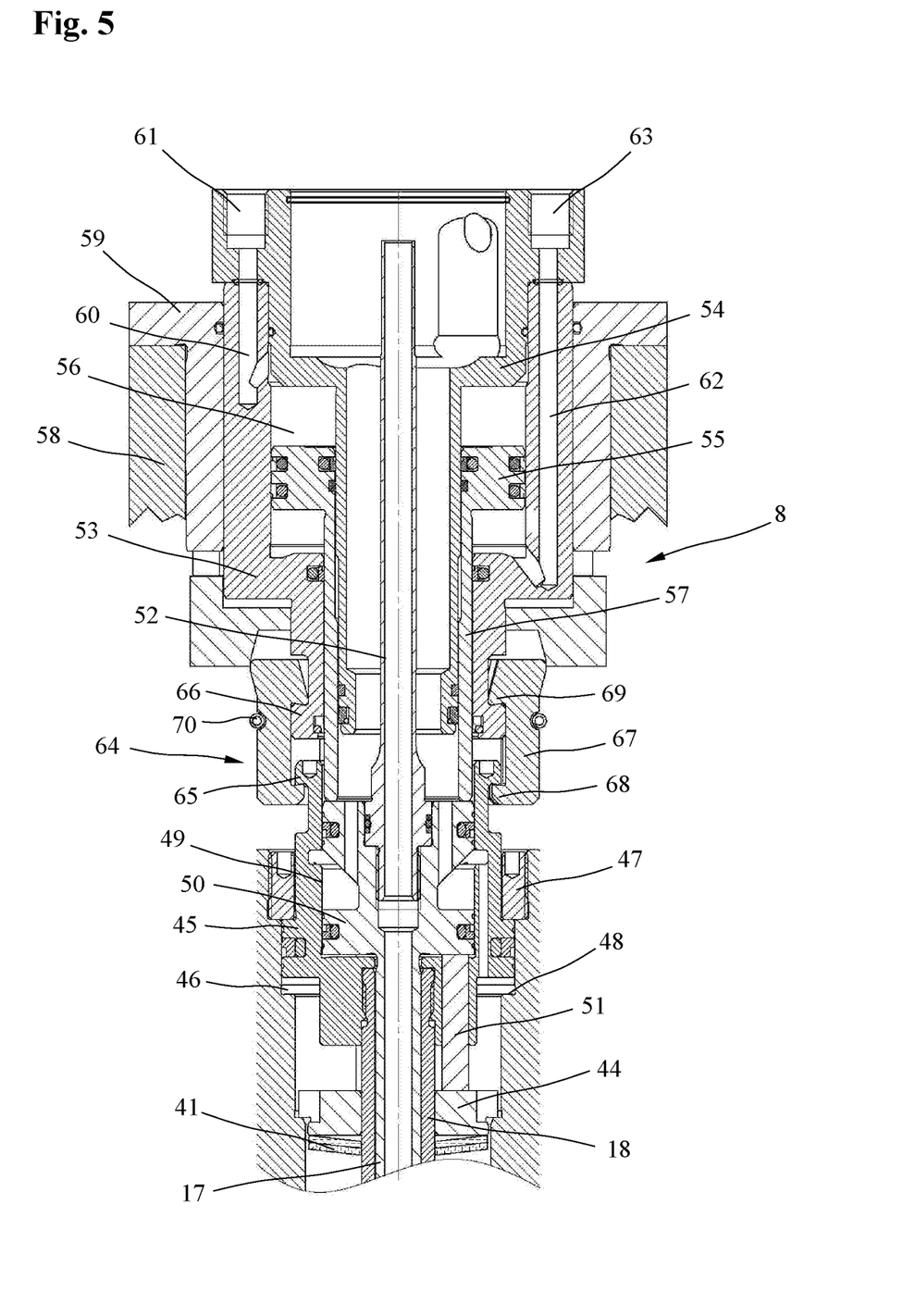

As indicated in FIGS. 4 and 5, a tension sleeve 45 is attached to the rearward end of the radially outward second rod part 18. The tension sleeve 45 is axially slidably guided in a rearward part 46 of the through-opening 42 of the machine part 2, which rearward part has an enlarged diameter, and is axially secured by a retaining ring 47 that is screwed into the rearward end of the machine part 2. The tension sleeve 45 is able to slide inside the machine part 2 between a ledge 48 and the retaining ring 47. In an opening 49 of the tension sleeve 45, a rearward end 50, which has an enlarged diameter, of the first rod part 17, which is slidably guided in the second rod part 18, is axially slidably guided. The rearward end 50 of the inside rod part 17 is connected to the thrust ring 44 by means of a plurality of pins 51 which are spaced apart from each other in the circumferential direction and axially slidably guided in the tension sleeve 45. Thus, through the pins 51, the thrust ring 44 can be moved by the rearward end 50 of the inside rod part 17. A transfer tube 52, through which the coolant or another pressure fluid can be supplied via the inside rod part 17 to the tool-holding fixture 1 or the tool, is screwed into the rearward end of the inside rod part 17.

The release mechanism 8 which is separately presented in FIGS. 4 and 5 is disposed on the rearward end of the machine part 2 that faces away from the tool-holding fixture 1. By means of the release mechanism 8, the first rod part 17 can be pushed into the through-opening 42 of machine part 2, and the second rod part 18 can be pulled out of the machine part 2 so that the clamping set 6 is moved against the force of the tension spring 7 into the released position by means of the tension rod formed by the two rod parts 17 and 18. As clamping set 6 moves into the released position, the tension spring 7 is additionally compressed on both ends by means of the release mechanism 8. This causes both ends of the tension spring 7 to be moved.

The release mechanism 8 comprises a hollow cylindrical enclosure which consists of an outwardly disposed first enclosure section 53 and a second enclosure section 54 disposed inside the first enclosure section and rigidly connected thereto. The two enclosure sections 53 and 54 bound an annular pressure chamber 55 in which an annular pressure piston 56 with a sleeve-shaped pressure piece 57 is guided and sealed by means of radial seals and disposed so as to be axially movable by means of a pressure medium. The enclosure, constructed of the two enclosure sections 53 and 54, is axially slidably disposed in a sleeve-shaped receiving fixture 59, which is attached to a spindle jacket 58 or another stationary part so that the release mechanism 8 can be moved relative to the machine part 2. The machine part 2 in the form of a work spindle can be rotatably mounted, e.g., in the spindle jacket 58.

Disposed in the first enclosure section 53 is a first axial feed opening 60 which leads through a slanted bore to a rearward end of the annular pressure chamber 55. Through a first coupling bore 61 in the second enclosure section 53, this feed opening 60 can be pressurized with a pressure fluid so as to extend the pressure piece 57 on the pressure piston 56. A second axial feed opening 62 in the first enclosure section 53 and a second slanted bore lead to the front end of the pressure chamber 55. Through a second coupling bore 63 in the second enclosure section 53, this feed opening 60 can be pressurized with a pressure fluid so as to retract the pressure piece 57 on the pressure piston 56.

The release mechanism 8 and the two rod parts 17 and 18 of the tension rod are connected to each other by means of the pressure piece 57 on the pressure piston 56, on the one hand, and, on the other, by means of a connecting piece 64 which extends over an annular collar 65 on the end of the tension sleeve 45, which end protrudes rearwardly relative to the machine part 2, and over an annular collar 66 on a front end of the enclosure section 53 facing the tension sleeve 45. The connecting piece 64 shown comprises a plurality of caliper-type connecting elements 67 spaced apart from each other in the circumferential direction and having front and rearward lugs 68 and 69 which extend over the collar 65 on the tension sleeve 45 and the collar 66 on the enclosure section 53. The caliper-type connecting elements 67 are held together by a spring 70 and are radially inwardly biased.

The clamping device described above functions as follows:

In the clamped position shown in FIG. 1, the two parts 9 and 10 of the clamping cone are moved toward one another by means of the tension spring 7 and the two rod parts 17 and 18 of the tension rod, and the tensioning elements 19 are pushed into a radially outward clamped position. In this clamped position, the outside clamping surfaces 22 and 25 of the tensioning elements 19 abut the conical inside surface 23 of the tool-holding fixture 1 and the conical counter surface 26, respectively, in the machine part 2, which retains the tool-holding fixture 1 under tension in the receiving slot 4 of machine part 2.

Since, during a machining operation the machine, part 2 in the form of a work spindle rotates at high speeds about the longitudinal axis 3 while the release mechanism 8 is not subjected to a rotational movement, there is no contact between the release mechanism 8 and the machine part 2 in the clamped position, which is also shown in FIG. 4. In the clamped position, the pressure piston 56 of the release mechanism 8 is retracted so that a gap is formed between the pressure piece 57 of the pressure piston 56 and the rearward end 50 of the first rod part 17. In the clamped position, a gap is also formed between the front lugs 68 of the connecting elements 67 and the tension sleeve 45.

To release the clamping device, a pressure fluid is fed through the first coupling bore 62 so that the pressure piston 56 is extended and its sleeve-shaped pressure piece 57 pushes against the rearward end 50 of the inwardly disposed first rod part 17 and slides it forward in the direction of the receiving slot 4 of machine part 2. At the same time, the two enclosure sections 53 and 54 of the axially movable enclosure of the release mechanism 8 is moved rearwards, so that the inwardly disposed second rod part 18 is pulled rearwards through the tension sleeve 45 and the connecting element 67. This also causes both ends of the tension spring 7, which clamped between the annular collar 43 on the second rod part 18 and the thrust ring 44, to be compressed, and the two parts 9 and 10 of the clamping cone are moved apart so that the tensioning elements 19 end up in the released position shown in FIG. 2. In this position, the tensioning elements 19 abutting the outside of the two parts 9 and 10 of the clamping cone have moved sufficiently radially inward to cause their clamping surfaces 22 to become disengaged from the conical inside surface 23 on the inside of the tool-holding fixture 1, and the tool-holding fixture 1 can easily be removed from the conical receiving slot 4.

The clamping set according to the disclosure is not limited to the embodiment example described above. Thus, the tensioning elements can have, e.g., the shape of a sphere or any other suitable shape. The clamping system according to the disclosure can be used not only in hollow taper shank tooling systems, but also in steep taper shank tooling systems or other clamping systems. The clamping set be configured both for mounting tools with hollow-taper shanks (HSK) and for mounting tools with steep-taper shanks (SK) in the manner of a collet, as a clamping set for polygon-taper shank tooling systems (PSC), as a clamping set with spherical tensioning elements or as a clamping set for other types of tool changing systems. The clamping device is also suitable for detachably mounting workpieces. Furthermore, different release mechanisms for moving the two rod parts of the tension rod together or apart can be used as well.

LIST OF REFERENCE CHARACTERS

1 Tool-holding fixture
2 Machine part
3 Longitudinal axis
4 Conical receiving slot
5 Cone
6 Clamping set
7 Tension spring
8 Release mechanism
9 First part of the clamping cone
10 Second part of the clamping cone
11 Conical clamping area
12 Conical exterior surface
13 Cylindrical guide area
14 Guide section
15 Conical clamping area
16 Conical exterior surface
17 First rod part
18 Second rod part
19 Claw-shaped tensioning elements
20 Centerline axis
21 First end of the tensioning elements
22 First outside clamping surface
23 Conical inside surface
24 Second end of the tensioning elements
25 Second outside clamping surface
26 Conical counter surface
27 Annular ledge
28 First inside clamping surface
29 Second inside clamping surface
30 Chamfer
31 Guide sleeve
32 Holding sleeve
33 Ledges
34 Front-end surface
35 Compression spring
36 Groove
37 Counter surface
38 Rearward contact surface
39 Ring segments
40 Slanted front ends
41 Plate spring
42 Through-opening
43 Annular shoulder
44 Thrust ring
45 Tension sleeve
46 Backward part of the through-opening
47 Retaining ring
48 Ledge
49 Opening
50 Rearward end of the first rod part
51 Pin
52 Transfer tube
53 Inside enclosure section
54 Outside enclosure section
55 Pressure chamber
56 Pressure piston
57 Pressure piece
58 Spindle jacket
59 Receiving fixture
60 First axial feed opening
61 First coupling bore
62 Second axial feed opening
63 Second coupling bore
64 Connecting piece
65 Collar
66 Collar
67 Caliper-type connecting element
68 Lug
69 Lug
70 Spring

What is claimed is:

1. A machining unit of a machine tool including a machine part and a clamping device for clamping a tool holding fixture to the machine part of the machine tool, the clamping device comprising:
    a tension rod slidably mounted within the machine part, the tension rod including a first rod part and a second rod part;
    a clamping set that can be moved by the tension rod between a clamped position and a released position;
    a tension spring dedicated to the tension rod for generating the pull-in force of the clamping set; and
    a release mechanism, by which the clamping set can be moved into the released position against the force of the tension spring by the tension rod,
    wherein the tension spring is clamped between the first rod part and the second rod part of the tension rod, which second rod part can move relative to the first rod part, the clamping set includes:
  a clamping cone having two parts that can be moved by the first and second rod parts of the tension rod in opposite directions relative to one another; and
  a plurality of tensioning elements abutting the outside of the two parts of the clamping cone, the tensioning elements being spaced apart from each other in the circumferential direction and being movable between a radially outward clamped position and a radially inward released position by sliding the two parts of the clamping cone in opposite directions,
the tension spring is disposed in a through-opening of the machine part such that the tension spring does not come into contact with the machine part both in the clamped position and in the released position of the clamping set, and
as the clamping set moves into the released position, the tension spring is compressed on both ends by the release mechanism by the oppositely directed movement of the first and second rod parts.

2. The machining unit of claim 1, wherein the release mechanism of the clamping device comprises:
  an enclosure for moving the second rod part, which enclosure is slidably mounted within a stationary receiving fixture; and
  a pressure piston for moving the first rod part, which pressure piston is slidably guided within a pressure chamber of the enclosure and can be moved by a pressure medium.

3. The machining unit of claim 2, wherein a tension sleeve is disposed on the rearward end of the second rod part, which tension sleeve is connected by a connecting piece to the enclosure of the release mechanism.

4. The machining unit of claim 3, wherein a rearward end of the first rod part is axially slidably mounted in the tension sleeve, which rearward end has an enlarged diameter.

5. The machining unit of claim 1, wherein the tensioning elements of the clamping set comprise a first inside clamping surface for abutting a conical exterior surface of the first part of the clamping cone and a second inside clamping surface for abutting a conical exterior surface of the second part of the clamping cone.

6. The machining unit of claim 1, wherein the first part of the clamping cone of the clamping set has a cylindrical guide area, on which a hollow cylindrical guide section of the second part of the clamping cone is slidably disposed.

7. The machining unit of claim 1, wherein the tensioning elements of the clamping set are configured in the form of clamping claws having a first outside clamping surface formed by a conical surface section and a second outside clamping surface which slants in the opposite direction relative to the first clamping surface and which is also formed by a conical surface section.

8. The machining unit of claim 1, wherein the machine part is a work spindle which is rotatably mounted in a spindle holding fixture and rotated by a motor.

9. The machining unit of claim 1, wherein the tension spring comprises a plurality of plate springs arranged one behind the other.

10. The machining unit of claim 1, wherein the tension spring is disposed in a central part of the through-opening of the machine part.

11. The machining unit of claim 1, wherein the tension spring is clamped between an annular shoulder of the second rod part and a thrust ring that is connected to the first rod part.

12. The machining unit of claim 11, wherein the tension spring is disposed between the annular shoulder of the second rod part and the thrust ring such that the tension spring does not come into contact with the machine part either in the clamped position or in the released position of the clamping set.

13. The machining unit of claim 1,
  wherein the tension spring is disposed in a central part of the through-opening of the machine part,
  a thrust ring is connected to the first rod part and is axially slidable within the through-opening of the machine part, and
  the tension spring is clamped between an annular shoulder of the second rod part and the thrust ring such that the tension spring does not come into contact with the machine part either in the clamped position or in the released position of the clamping set.

14. A clamping device for clamping a tool holding fixture to a machine part of a machine tool, the clamping device comprising:
  a tension rod slidably mounted within the machine part;
  a clamping set that can be moved by the tension rod between a clamped position and a released position;
  a tension spring dedicated to the tension rod for generating the pull-in force of the clamping set and
  a release mechanism, by which the clamping set can be moved into the released position against the force of the tension spring by the tension rod,
  wherein the tension spring is clamped between a first rod part and a second rod part of the tension rod, which second rod part can move relative to the first rod part,
  as the clamping set moves into the released position, the tension spring is compressed on both ends by the release mechanism by the oppositely directed movement of the first and second rod parts,
  the release mechanism comprises an enclosure for moving the second rod part, which enclosure is slidably mounted within a stationary receiving fixture, and a pressure piston for moving the first rod part, which pressure piston is slidably guided within a pressure chamber of the enclosure and can be moved by a pressure medium,
  a tension sleeve is disposed on the rearward end of the second rod part, which tension sleeve is connected by a connecting piece to the enclosure of the release mechanism, and
  the connecting piece comprises a plurality of caliper-type connecting elements which are spaced apart from each other in the circumferential direction and the front and rearward lugs of which extend over a collar on the tension sleeve and over a collar on an enclosure section of the enclosure.

15. The clamping device of claim 14, wherein the caliper-type connecting elements are held together by a spring and are inwardly biased.

16. A clamping device for clamping a tool holding fixture to a machine part of a machine tool, the clamping device comprising:
  a tension rod slidably mounted within the machine part;
  a clamping set that can be moved by the tension rod between a clamped position and a released position;
  a tension spring dedicated to the tension rod for generating the pull-in force of the clamping set; and
  a release mechanism, by which the clamping set can be moved into the released position against the force of the tension spring by the tension rod, wherein the tension spring is clamped between a first rod part and a second rod part of the tension rod, which second rod part can move relative to the first rod part, as the clamping set moves into the released position, the tension spring is compressed on both ends by the release mechanism by the oppositely directed movement of the first and second rod parts, the release mechanism comprises an enclosure for moving the second rod part, which enclosure is slidably mounted within a stationary receiving fixture, and a pressure piston for moving the first rod part, which pressure piston is slidably guided within a pressure chamber of the enclosure and can be moved by a pressure medium, a tension sleeve is disposed on the rearward end of the second rod part, which tension sleeve is connected by a connecting piece to the enclosure of the release mechanism, a rearward end of the first rod part is axially slidably mounted in the tension sleeve, which rearward end has an enlarged diameter, and the rearward end of the first rod part is connected to a thrust ring by a plurality of pins that are axially slidably guided in the tension sleeve.

17. The clamping device of claim 16, wherein the tension spring is clamped between an annular shoulder of the second rod part and the thrust ring, which is connected to the first rod part.

* * * * *